United States Patent
Deimerly et al.

(10) Patent No.: US 9,140,550 B2
(45) Date of Patent: Sep. 22, 2015

(54) INERTIAL MICRO-SENSOR OF ANGULAR DISPLACEMENTS

(71) Applicant: COMMISSARIAT A L'ENERGIE ATOMIQUE ET AUX ENERGIES ALTERNATIVES, Paris (FR)

(72) Inventors: Yannick Deimerly, Grenoble (FR); Guillaume Jourdan, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 314 days.

(21) Appl. No.: 13/690,836

(22) Filed: Nov. 30, 2012

(65) Prior Publication Data

US 2013/0205897 A1 Aug. 15, 2013

(30) Foreign Application Priority Data

Dec. 2, 2011 (FR) ..................................... 11 61112

(51) Int. Cl.
*G01C 19/56* (2012.01)
*G01C 19/5712* (2012.01)
(Continued)

(52) U.S. Cl.
CPC ........ *G01C 19/5712* (2013.01); *G01C 19/5747* (2013.01); *G01C 19/5762* (2013.01)

(58) Field of Classification Search
CPC ............. G01P 3/02; G01P 3/56; G01C 19/56; G01C 19/5712; G01C 19/5747; G01C 19/5762
USPC ............................. 73/504.12, 504.14, 504.16
See application file for complete search history.

(56) References Cited

U.S. PATENT DOCUMENTS 5,691,471 A    11/1997   Okazaki et al.
5,895,852 A     4/1999   Moriya et al.
(Continued)

FOREIGN PATENT DOCUMENTS

EP          0 785 413 A2   7/1997
WO    WO 2011/016859 A2   2/2011

OTHER PUBLICATIONS

French Preliminary Search Report and Written Opinion issued Jul. 4, 2012, in French 1161112, filed Dec. 2, 2011 (with English Translation of Categories of Cited Documents).

(Continued)

*Primary Examiner* — Helen Kwok
(74) *Attorney, Agent, or Firm* — Oblon, McClelland, Maier & Neustadt, L.L.P.

(57) ABSTRACT

The present invention relates to an inertial micro-sensor of angular displacements comprising at least one inertial mass (112, 1210) movable in space (x, y, z); an exciter (131) configured to generate a first vibratory movement of the inertial mass along a first direction (X) included in the plane (x, y), so as to generate a first Coriolis force induced by an angular displacement of the inertial mass (112, 1210) around a second direction (Y) included in the plane (x, y) and perpendicular to the first direction (X); an exciter (131) configured to generate a second vibratory movement of the inertial mass along the second direction (Y), so as to generate a second Coriolis force induced by an angular displacement of the inertial mass (112, 1210) around the first direction (X), and means for detecting the first Coriolis force and the second Coriolis force, characterized by the fact that the detection means comprise a common detector for the first Coriolis force and the second Coriolis force and configured to produce an electrical signal processed by a processing circuit so as to distinguish a first component of the electrical signal corresponding to the first Coriolis force and a second component of the electrical signal corresponding to the second Coriolis force.

16 Claims, 9 Drawing Sheets

(51) Int. Cl.
*G01C 19/5747* (2012.01)
*G01C 19/5762* (2012.01)

(56) References Cited

U.S. PATENT DOCUMENTS

| | | | |
|---|---|---|---|
| 6,349,597 B1 * | 2/2002 | Folkmer et al. | 73/504.02 |
| 7,040,162 B2 * | 5/2006 | Lehureau et al. | 73/504.12 |
| 2004/0211258 A1 | 10/2004 | Geen | |
| 2009/0205423 A1 | 8/2009 | Takagi et al. | |
| 2010/0307243 A1 | 12/2010 | Prandi et al. | |

OTHER PUBLICATIONS

Yoshiyuki Watanabe, et al., "Five-axis motion sensor with electrostatic drive and capacitive detection fabricated by silicon bulk micromachining" Sensors and Actuators A, Elsevier, vol. 97-98, 2002, pp. 109-115.

Yoshiyuki Watanabe, et al., "SOI micromachined 5-axis motion sensor using resonant electrostatic drive and non-resonant capacitive detection mode" Sensors and Actuators A, Elsevier, vol. 130-131, 2006, pp. 116-123.

Nan-Chyuan Tsai, et al., "Fabrication and analysis of a micro-machined tri-axis gyroscope", Journal of Micromechanics and Microengineering 18, 115014, 2008, 15 pages.

Ranjith Amarasinghe, et al., "Development of miniaturized 6-axis accelerometer utilizing piezoresistive sensing elements", Sensors and Actuators A, Elsevier, vol. 134, 2007, pp. 310-320.

Heng Yang, et al., "Two-dimensional excitation operation mode and phase detection scheme for vibratory gyroscopes", Journal of Micromechanics and Microengineering vol. 12, 2002, 6 pages.

* cited by examiner

INERTIAL MICRO-SENSOR OF ANGULAR DISPLACEMENTS

TECHNICAL FIELD OF THE INVENTION

The present invention relates in general to inertial movement sensors and more particularly to those having the form of electromechanical microsystems or MEMS (from the English "Micro Electro Mechanical Systems").

PRIOR ART

Ever since it became known how to construct inertial sensors of very small sizes in the form of MEMS, the English acronym for "micro electromechanical systems", in other words "electromechanical microsystems", their area of application has not stopped expanding. At one time reserved almost exclusively for aerial navigation and for ballistic applications, essentially military, of the rockets and missiles type, the inertial sensors, the cost of which has dropped considerably along with their miniaturization, are now commonly employed in very numerous applications characterized as "general public". For example, they are used for stabilization of video recorder images or of fixed images, camcorders and photographic devices; by the automobile industry as collision detectors for airbags or control of the active suspension of vehicles; in game consoles as movement detectors, and in many other applications.

Based substantially on the technology of silicon, the basic material of the microelectronics industry, also used in MEMS because of its excellent mechanical properties, they may now benefit from all the technological advances contributed by this industry. For their manufacture, the MEMS may make advantageous use in particular of the constant improvements achieved in photolithography and other etching techniques widely employed by the microelectronics industry for silicon and all the other materials that it currently uses.

Thus the manufacture of MEMS is naturally following the microelectronics trend of being capable of defining patterns of progressively smaller dimensions. It will be noted that the smallest MEMS are now often referred to as NEMS, in other words "nano electromechanical systems", to acknowledge this trend to even greater miniaturization, in which the dimensions are now expressed in nanometers.

In the field of inertial micro sensors, the miniaturization is reflected by the fact that the mechanical part proper is occupying progressively less space compared with its electrical interconnection means. Furthermore, while the surface area of the MEMS is becoming smaller, increasing efforts are being made to detect the maximum possible axes with the same inertial sensor. In a three-dimensional system, as many as six detection axes are defined, corresponding to measurement of the angular velocity in the three directions of space, traditionally denoted by X, Y and Z, and to measurement of the acceleration in the same directions. There is a different detector for each of the axes to be measured, thus commensurately increasing the number of electrical interconnections with which the sensor must be provided.

Although photolithography has made considerable advances that permit even greater miniaturization, the same is not true, however, for the means of interconnecting silicon chips with their environment. The traditional method still consists in using what is known as the "wire bonding" technique, or welding of a gold wire onto metal pads that have been prepared on each chip for each of its external connections. These pads are of standardized size and are not becoming smaller, even through the mechanical part of the sensor is occupying a progressively smaller proportion of the total surface area of the device, until becoming significantly smaller than that occupied by the electrical connections themselves.

Thus, in order to be able to continue miniaturizing the inertial micro sensors, it must also be possible to reduce the surface area occupied by the electrical connections. It is therefore an object of the invention to describe an inertial micro movement sensor that addresses this problem.

The other objects, characteristics and advantages of the present invention will become apparent upon examination of the description hereinafter and of the accompanying drawings. It is understood that other advantages may be incorporated.

SUMMARY OF THE INVENTION

The invention relates in particular to an inertial micro-sensor of angular displacements comprising: at least one inertial mass movable in space (X, Y, Z); a first exciter configured to generate a first vibratory movement of the inertial mass along a first direction (X), so as to generate a first Coriolis force along a third direction (Z), induced by an angular displacement of the inertial mass around a second direction (Y), the first, second and third directions being mutually perpendicular; a second exciter configured to generate a second vibratory movement of the inertial mass along the second direction (Y), so as to generate a second Coriolis force along the third direction (Z), induced by an angular displacement of the inertial mass around the first direction (X); means for detecting the first Coriolis force and the second Coriolis force.

According to the invention, the detection means comprise a common detector for the first Coriolis force and the second Coriolis force and configured to produce an electrical signal processed by a processing circuit so as to distinguish a first component of the electrical signal corresponding to the first Coriolis force and a second component of the electrical signal corresponding to the second Coriolis force.

The angular displacement or displacements detected by the invention may be one or respectively more of the components of rotation of a movement that may be complex, in other words not strictly limited to a pure rotation around an axis.

The inertial mass may be movable in a plane parallel to its own plane or out of this plane (especially in a plane perpendicular to that of the inertial mass).

Thus, according to the invention, the first and second directions X, Y correspond to the excitation directions and the third direction Z corresponds to the detection direction; the directions X, Y may form a plane parallel to that of the inertial mass as represented in the figures, but also a plane perpendicular to that of the inertial mass, in which case the exciters are disposed in planes parallel to the mass, on opposite sides thereof.

According to one non-limitative aspect of the invention, the common detector measures a displacement along Z of at least one mass to which the Coriolis force is applied, for example the inertial mass itself or a mass linked thereto. The measurement may in particular be capacitive or may rely on at least one piezoresistive gauge.

An advantageous effect of the invention is to dispose, on a single electrical output, two detection information signals.

The advantageous characteristics of the invention include the following non-limitative options, which may or may not be combined:

the frequency of the first vibratory movement is different from the frequency of the second vibratory movement;

the processing circuit of the detection means is configured to achieve frequency processing of the electrical signal;

the processing circuit is provided with a first frequency filter configured to discriminate the first component of the electrical signal and a with second frequency filter configured to distinguish the second component of the electrical signal;

the processing circuit is provided with demodulation of the variation of amplitude for each of the first and second components;

the first exciter is configured to make the inertial mass vibrate at its resonance frequency along the first direction (X);

the second exciter is configured to make the inertial mass vibrate at its resonance frequency along the second direction (Y);

the first exciter is provided with a generator of the first vibratory movement and with an excitation mass driven in vibration by the generator and kinematically linked to the inertial mass so as to deliver thereto the first vibratory movement without transmitting at least part of the movements along the second and third direction (Z);

the second exciter is provided with a generator of the second vibratory movement and with an excitation mass driven in vibration by the generator and kinematically linked to the inertial mass so as to deliver thereto the second vibratory movement without transmitting at least part of the movements along the first and third direction (Z);

the device is provided with a detection mass kinematically linked to the inertial mass and at which the common detector detects the first Coriolis force and the second Coriolis force;

the detection mass is kinematically linked to the inertial mass along an axis parallel to one of the first, second or third directions (X, Y, Z), so as to be animated by the second vibratory movement;

on the other hand, the link may be established by a link configured to form, together with the inertial mass along the said axis, an inertial assembly exhibiting at least two resonance frequencies along this axis;

the detection mass is kinematically linked to the inertial mass along the said axis so as to form, in the third direction (Z) of the first Coriolis force and of the second Coriolis force, an inertial assembly exhibiting at least two resonance frequencies;

the frequency of the first vibratory movement and the frequency of the second vibratory movement are lower than or equal respectively to a first and a second resonance frequency of the inertial assembly in the third direction;

the first resonance frequency is a resonance frequency in phase opposition and the second resonance frequency is a resonance frequency in phase;

the device is provided with an additional inertial mass, the said additional inertial mass being linked to the inertial mass so as to transmit to the said additional inertial mass a Coriolis force along the second direction (Y), induced by an angular displacement of the said inertial mass around the third direction (Z) out of the plane (x, y);

an additional detector is configured to detect the said Coriolis force;

an additional inertial mass linked to the inertial mass so as to transmit to the said additional inertial mass a Coriolis force along the first direction (X), induced by an angular displacement of the said inertial mass around the third direction (Z) out of the plane (x, y);

an additional detector is configured to detect the said Coriolis force.

BRIEF DESCRIPTION OF THE FIGURES

The objectives, objects, as well as the characteristics and advantages of the invention will become more apparent from the detailed description of an embodiment thereof illustrated by the following accompanying drawings, wherein.

Figure 1:
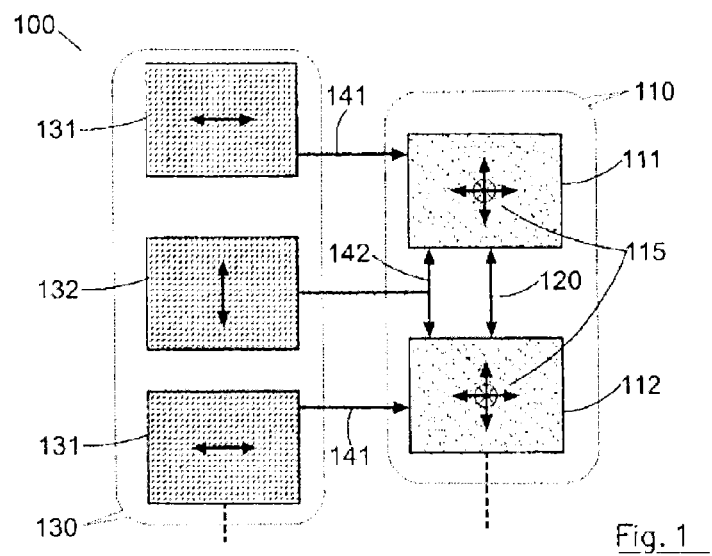
FIG. 1 illustrates the block diagram of a biaxial gyrometer according to the invention and the interactions between the masses set into movement.

The attached drawings are given by way of examples and are not limitative of the invention.

DETAILED DESCRIPTION OF THE INVENTION

The invention is able to solve the problem of the surface area occupied by the interconnections of a micro sensor by reducing the number of detectors necessary and more particularly by permitting a given detector to be able to detect several axes simultaneously. The invention is described through the example of a gyrometer comprising a single detector capable of detecting the velocity along several axes.

The gyrometers considered by the invention are those in which the effect of the Coriolis force is used, which force is expressed in the form of the following vector product:

$$F_i = -2 * m * \Omega_j \wedge v_k$$

Since the subscripts i, j and k correspond to orthonormal axes, the Coriolis force $F_i$ created is proportional to the inertial mass m and is perpendicular to the angular velocity $\Omega_j$ and to the excitation velocity $v_k$. An excitation is therefore necessary in order to furnish an excitation velocity. An electrostatic excitation may be written:

$$v_k = V_0 * \cos(w_{EXC} * t)$$

The Coriolis force intrinsically executes amplitude modulation, such as defined in radioelectricity, by a voltage $V_0$. In fact, if subscripts i, j and k represent an orthogonal base:

$$F_i = -2*m*\Omega_j*V_0*\cos(\omega_{EXC}*t)$$

It is therefore possible to modulate $\Omega_j$ by the excitation frequency $w_{EXC}$. In addition, it is noted that j and k are interchangeable in the first of the above equations:

$$F_i = -2*m*\Omega_k \wedge v_j$$

It is therefore possible to create a force of axis i having two components:

$$F_i = -2*m*\Omega_j \wedge v_k$$

and $$F_i = -2*m*\Omega_k \wedge v_j$$

which add up to:

$$\Sigma F_i = FTOT_i = 2*m*(\Omega_j \wedge v_k + (\Omega_k \wedge v_j))$$

or else:

$$FTOT_i = 2*m*[\Omega_j*V_0*\cos(\omega_{1EXC}*t) - \Omega_k*V_1*\cos(\omega_{2EXC}*t)]$$

The force along axis i therefore has one component at frequency $w1_{EXC}$ and a second component at frequency $w2_{EXC}$. It will be possible to detect the force by using a piezoresistive detector whose resistance varies as a function of mechanical stresses applied to it, or by using a capacitive movement detector. In both cases, the measured signal preserves the two-component frequency spectrum hereinabove. Because the intensity of the components $w1_{EXC}$ and $w2_{EXC}$ is proportional to $\Omega_j$ and $\Omega_k$ respectively, it becomes possible to extract two velocities of rotation of a given signal originating from a single detector, thus opening up the possibility of reducing the number of detectors of a gyrometer employing this technique and therefore the number of its external connections, which at present are limiting the miniaturization of these devices, as has been seen hereinabove.

From the signal furnished by the single detector, it must therefore be possible to extract a component at the frequency $w1_{EXC}$ that corresponds to the angular velocity around j and a second component at the frequency $w2_{EXC}$ that corresponds to the angular velocity around k. This is accomplished using filtering means, which may be conventional and are employed, for example, in an electronic circuit dedicated to the gyrometer and intended to furnish the electrical excitation and control signals as well as to measure the signal delivered by the single detector. The separation of the velocity information signals furnished by the detector is typically accomplished by using conventional passive or active band-pass filters, the pass band of which is centered on the frequencies hereinabove. The selectivity of the filters will have to be high, so that only a small fraction of the frequency spectrum around each of the excitation frequencies is transmitted. Two different electrical signals are therefore obtained:

$$S_1 = -2*m*\Omega_j*V_0*\cos(\omega_{1EXC}*t)$$

$$S_2 = -2*m*\Omega_j*V_1*\cos(\omega_{2EXC}*t)$$

The demodulation of variations of signal amplitude hereinabove, which reflect the velocity of the movement to be measured, is then applied separately to each extracted signal. Among the known demodulation means, the simplest method remains filtering of the high-frequency component by means of an envelope detector comprising a diode coupled with a low-pass filter. This is a standard circuit that is well known in the field of radio broadcasting for decoding amplitude-modulated signals.

Since $V_0$ and $V_1$ are respectively the amplitude of the excitation signals along k and j, $\Omega_j$ and $\Omega_k$ are the velocities of rotation, G1 and G2 are the band-pass filter gains and m is the inertial mass, there are indeed obtained a signal $U_1$ proportional to the velocity of rotation around j and a signal $U_2$ proportional to the velocity of rotation around k, as indicated in the following relationships:

$$U_1 = -2*m*\Omega_j*V_0*G_1 \quad U_2 = -2*m*\Omega_k*V_1*G_2$$

The use of a gyrometer according to the principles explained hereinabove is described in the figures that follow.

FIG. 1 shows the block diagram of a biaxial gyrometer 100 according to the invention and the interactions between the masses set into movement.

Gyrometer 100 comprises an assembly of inertial masses 110, in the present case composed in fact of two individual masses 111 and 112, linked by a coupling spring 120. This number is not limitative. In the example, one of the masses, 112, is a primary mass, and the other mass, 111, also functions directly for detection.

The employment of two inertial masses 111, 112 linked to one another by a spring element and each linked to the substrate by other spring elements, makes it possible to form a kinematic system with two masses and two degrees of freedom, thus implying two resonance (or natural) frequencies in a movement along a given direction (X or Z in particular). In particular, the formation of an assembly 110 with two natural frequencies along Z makes it possible to adjust the excitation frequency along X as a function of one of the natural frequencies and to adjust the excitation frequency along Y as a function of the other of the natural frequencies. In this way, it is endeavored to achieve privileged function of the kinematic system formed by assembly 110 so that:

the movements along X and Y take place at the resonance frequencies along these directions;

the movement along Z takes place with two components originating from generated Coriolis forces, so that the frequency of each component is close or equal to a resonance frequency of assembly 110 along Z.

The individual inertial masses are set into movement by excitation masses 130 via transmission springs 141 and 142, which communicate the movement to the inertial masses each along a privileged axis. The individual excitation masses or exciters 131 and 132 themselves oscillate along one privileged axis each, in other words along one or the other of the two orthogonal axes of the plane in which the excitations are communicated to the inertial masses.

In order to detect the Coriolis forces generated by the exterior movements to which the gyrometer is subjected, inertial masses 111, 112 are arranged in such a way that they are also free to move (both, or at least detection mass 111) along a third axis, perpendicular to the excitation plane, as illustrated by tridirectional ideogram 115. It is this displacement that is measured by a detection means, for example in the form of measurement of a variation of capacitance, as described in the following figure.

Figure 14:
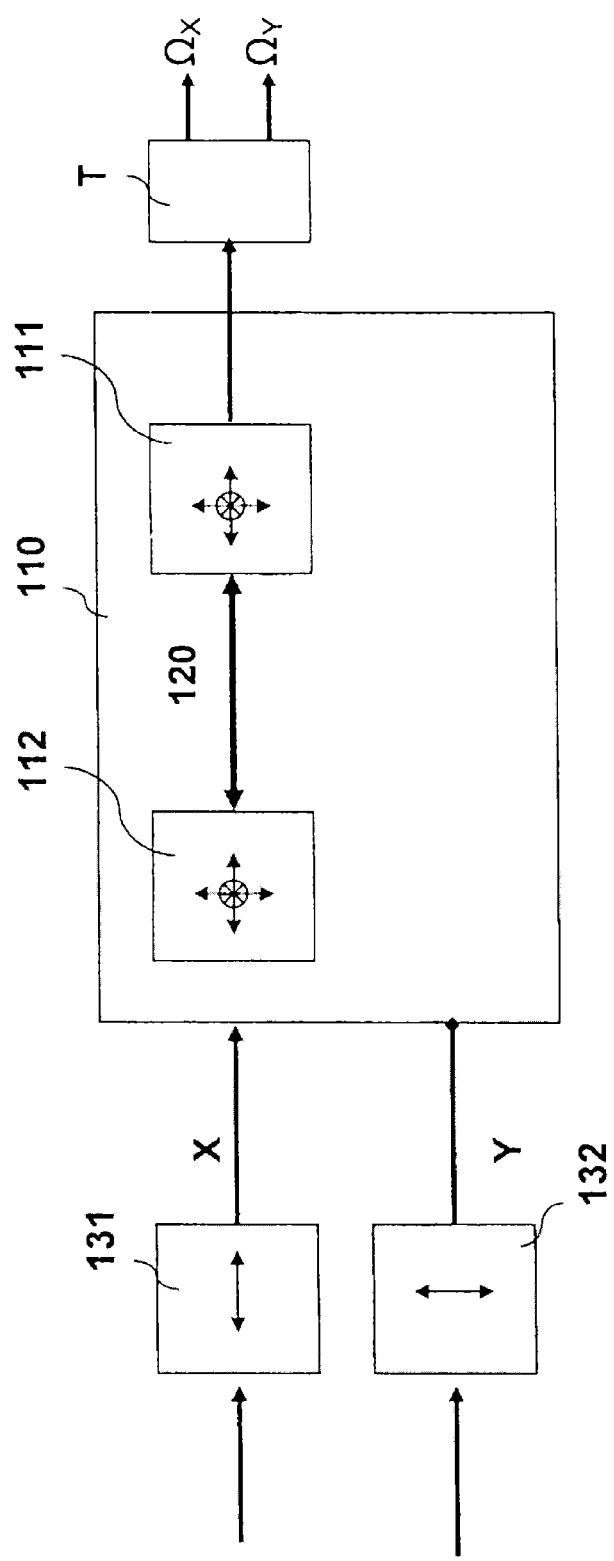
FIG. 14 summarizes the mobilities and functions of parts of the invention in one embodiment.

FIG. 14 shows another schematic view of the invention. In this figure:

an excitation mass 131 is subjected to an electrostatic force along X and consequently produces a movement transmission, advantageously along X only, toward inertial assembly 110 and more particularly at least toward inertial mass 112 of this assembly.

an excitation mass 132 is subjected to an electrostatic force along Y and consequently produces a movement transmission, advantageously along Y only, toward inertial assembly 110 and more particularly at least toward inertial mass 112 of this assembly.

in the illustrated case, inertial assembly 110 is provided with two masses, specifically an inertial mass 112 and a detection mass 111. Preferably, the two masses 111, 112 are linked so as to form a mobile unit with two resonance frequencies along direction Z. Thus the inertial assembly has two resonance frequencies along the direction of the Coriolis forces. For example, their link is provided with a spring element along Z. Preferably, the two masses 111, 112 are linked so as to form a mobile unit with two resonance frequencies along one of the directions X and Y, for example X. In particular, their link may form a spring element along that direction. In the remaining direction, for example Y, the two masses 111, 112 may be animated by the same vibratory movement originating from excitation mass 132. Detection mass 111 cannot be urged by one or the other or any of the two vibratory movements along X and Y.

the detection mass assures the function of an element for sensing Coriolis forces, and in FIG. 14 it cooperates with a processing block T, configured, for example, to detect the displacements or the forces along Z.

from this block T there are obtained, via the same detection mass 111, two information signals about movement, one along X, the other along Y.

In the present description, the notations X, Y, Z are indicative.

Figure 2:
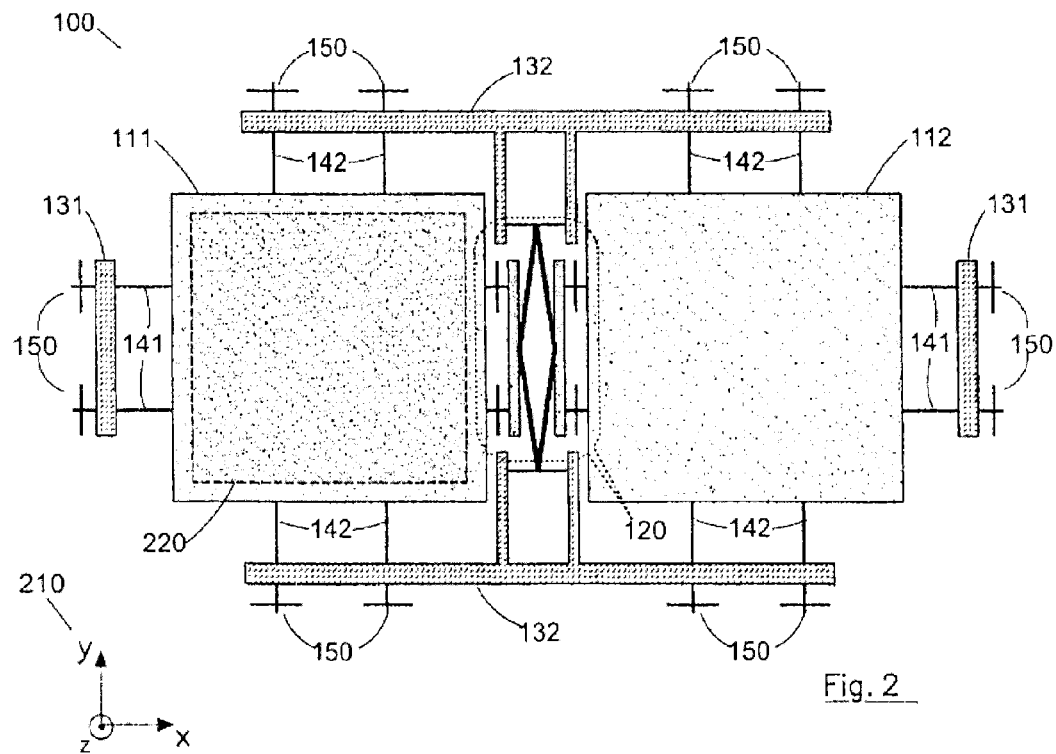
FIG. 2 is a plan view of an exemplary embodiment of the biaxial gyrometer with two inertial masses coupled according to the invention.

FIG. 2 is a plan view of an exemplary embodiment of the block diagram of FIG. 1 of a biaxial gyrometer, wherein the detection means is capacitive. The two inertial masses 111 and 112, linked by coupling spring 120, reappear therein.

As illustrated at 210, the two orthogonal axes of the excitation plane are conventionally denoted by X and Y and the axis for detecting the displacement of the inertial masses under the effect of Coriolis forces, which act perpendicular to excitation plane XY, is denoted Z.

The velocity of rotation of the gyrometer around axis Y is measured by the Coriolis force resulting from the continuous oscillation communicated to the individual inertial masses along the perpendicular axis, in other words axis X. The corresponding excitation masses, in other words the two masses 131 that oscillate preferentially along axis X, are situated on opposite sides of the individual inertial masses. By means of transmission springs 141, they communicate movements in phase opposition to individual masses 111 and 112, in such a way that the displacement of the individual masses takes place in always opposite directions along axis X. The function of coupling spring 120 is to absorb these displacements in opposite directions.

Under these conditions, an angular displacement to which the gyrometer is subjected around axis Y will also result in a displacement of individual inertial masses 111 and 112 in opposite directions along axis Z.

In the example of FIG. 2, the detection of these displacements along axis Z takes place capacitively. To this end, a fixed electrode 220 has been placed under one of the individual inertial masses 111, 112. The displacements generated by the Coriolis forces cause a variation of the distance between the electrodes constituted on the one hand by one of the two individual inertial masses 111 or 112 and on the other hand by fixed electrode 220 situated underneath, and therefore of the value of this capacitance. The variations of the value of capacitance correspond to the velocities of rotation to which the gyrometer is subjected.

In the illustrated case, one of the inertial masses, mass 111, is used for detection. Thus it is also referred to here as detection mass. It is where the Coriolis force, reflected by a movement in an effort along Z, is detected.

In symmetric manner, the velocity of rotation of the gyrometer around axis X is measured by the Coriolis force resulting from the continuous oscillation communicated to the individual inertial masses along the perpendicular axis, in other words axis Y. The corresponding excitation masses, in other words the two masses 132 that oscillate preferentially along axis Y, are situated above and below the individual inertial masses in the diagram of FIG. 2. By means of transmission springs 142, they communicate movements in phase to individual inertial masses 111 and 112. The displacement of these masses along axis Y therefore takes place in the same direction. Under these conditions, an angular displacement to which the gyrometer is subjected around axis X will result in this case in a displacement of individual inertial masses 111 and 112 in the same direction along axis Z.

It will be noted that excitation masses 131 and 132 are set into movement by means of interdigital combs (not represented) to which an alternating signal is applied. These combs force the excitation masses to move along a single axis, respectively X and Y. The excitation masses are fastened to guide springs 150.

Figure 3:
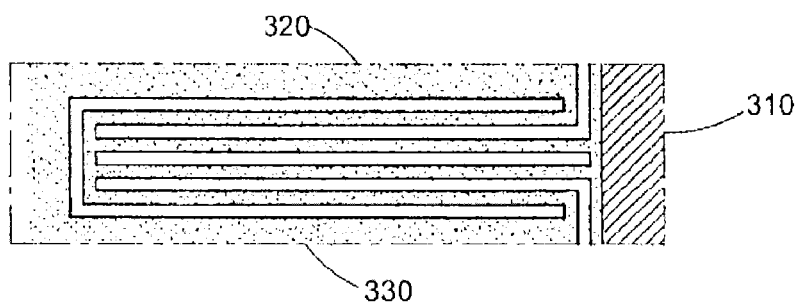
FIG. 3 illustrates a type of spring said to be "folded" which is typically used as a transmission spring.

FIG. 3 illustrates a type of spring referred to as "folded", which typically functions as transmission spring 141 and 142 between excitation masses 130 and assembly 110 of inertial masses. The transmission takes place between an input 310 of the spring toward one or the other of outputs 320 and 330, or toward both simultaneously.

Figure 4:
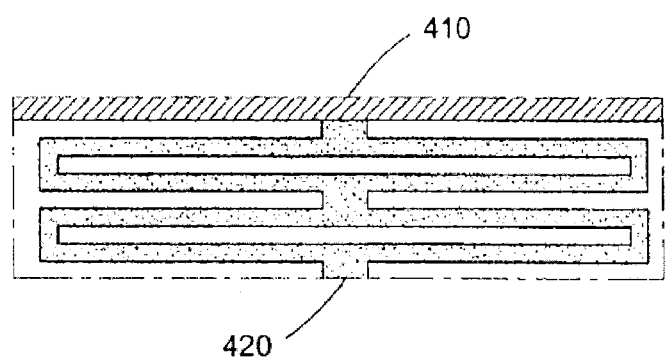
FIG. 4 illustrates a second type of spring functioning as a guide spring.

FIG. 4 illustrates a second type of spring, which is U-shaped. Typically it may function as guide spring 150 for the excitation masses. This type of spring is symmetric, and one or the other of the two sides 410 and 420 is able to function as input or output.

Figure 5:
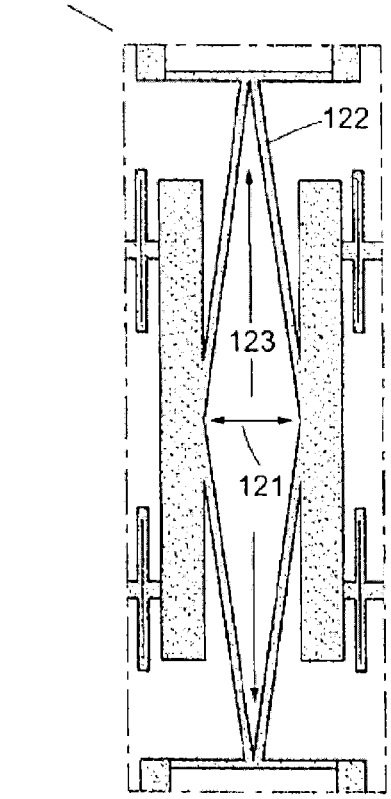
FIG. 5 illustrates the structure of the coupling spring linking the two inertial masses.

FIG. 5 illustrates the structure of coupling spring 120 situated between the two inertial masses 111 and 112, which permits them to move in phase opposition. As can be seen, this diamond-shaped spring 122 can be deformed in width 121 and height 123 to absorb the opposing movements of the two inertial masses 111 and 112 situated on opposite sides, when they recede from or approach one another by virtue of their phase opposition.

Figure 6:
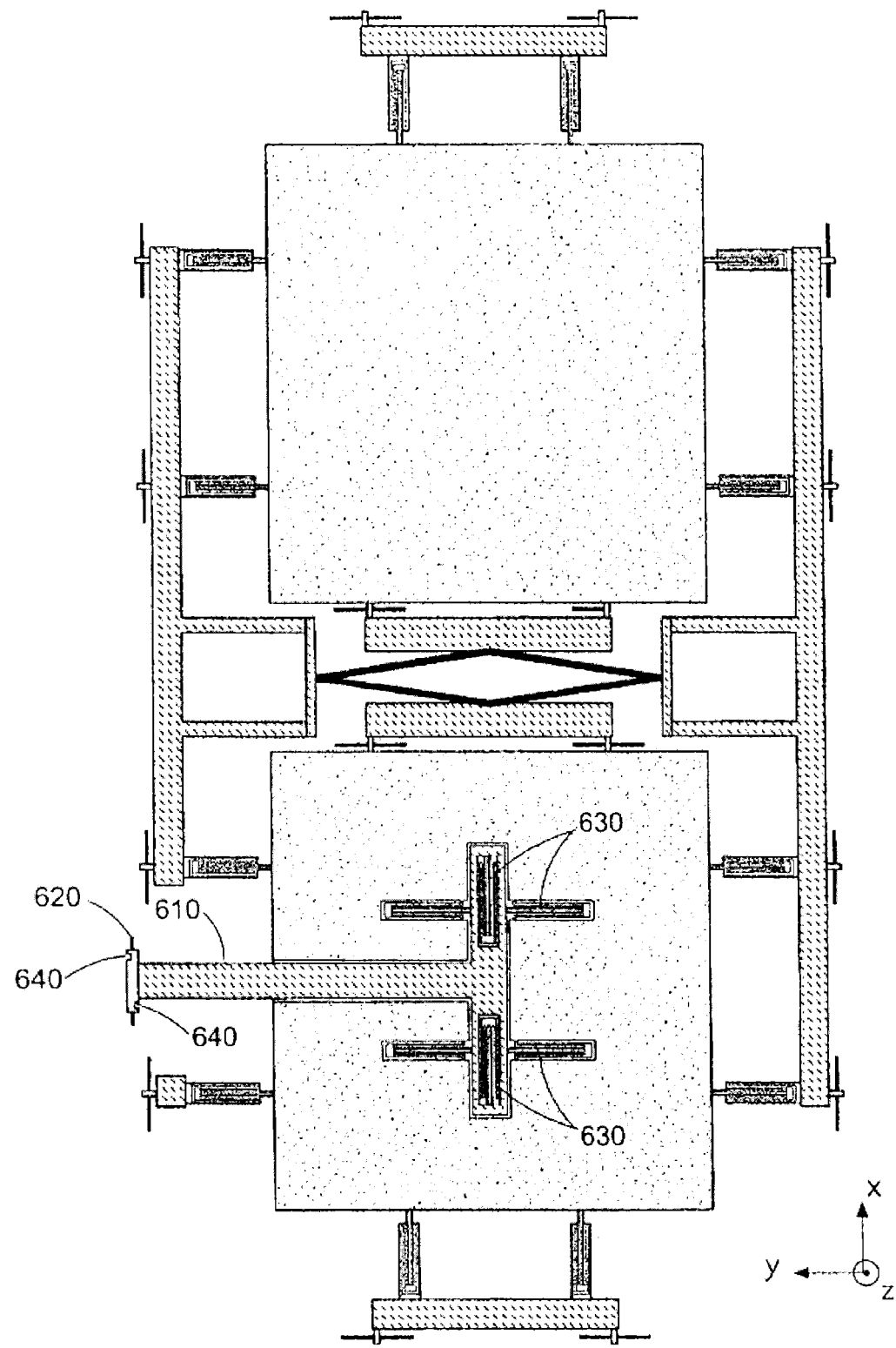
FIG. 6 is a plan view of a biaxial gyrometer according to the invention, wherein the means for detecting Coriolis forces is a piezoresistive element.

FIG. 6 is a plan view of a biaxial gyrometer according to the invention, wherein the means for detecting Coriolis forces is in this case a piezoresistive element instead of the capacitive element described in the foregoing.

All the elements already described in FIG. 2 reappear in FIG. 6. They are no different with the exception of addition of a detection arm 610 capable of turning around a pivot 620 as a function of movements caused by the Coriolis forces along axis Z on inertial mass 111 functioning as detection mass. The arm is connected to the inertial mass by means of springs 630 arranged so as to transmit only the movements along axis Z thereto. Springs 630 are advantageously of the same type as that described in FIG. 3, in other words they are of the "folded" type.

The angular displacement of the arm applies mechanical stresses in tension and compression, typically to two piezoresistive detectors 640 situated in pivot 620. The evaluation of the generated Coriolis force takes place by measuring the variations of resistance observed in the piezoresistive element or elements subjected to the mechanical stresses resulting from the movement of arm 610.

Figure 7:
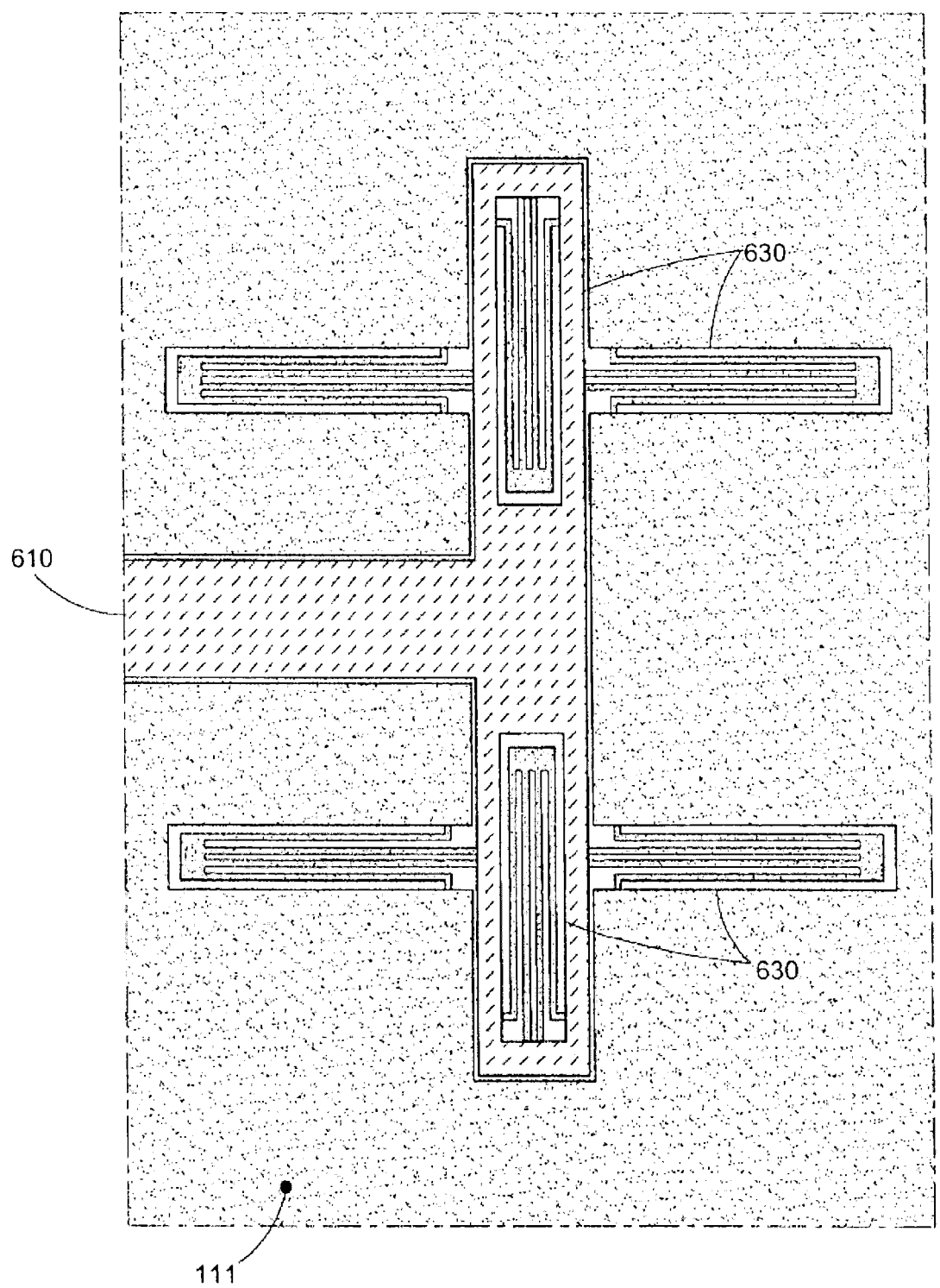
FIG. 7 is a detailed view of the arm and of the springs that transmit the movements of the inertial mass to the piezoresistive element.

FIG. 7 is a detailed view of arm 610 and of springs 630 that permit only the movements of inertial mass 111 along Z to be transmitted thereto.

Figure 8:
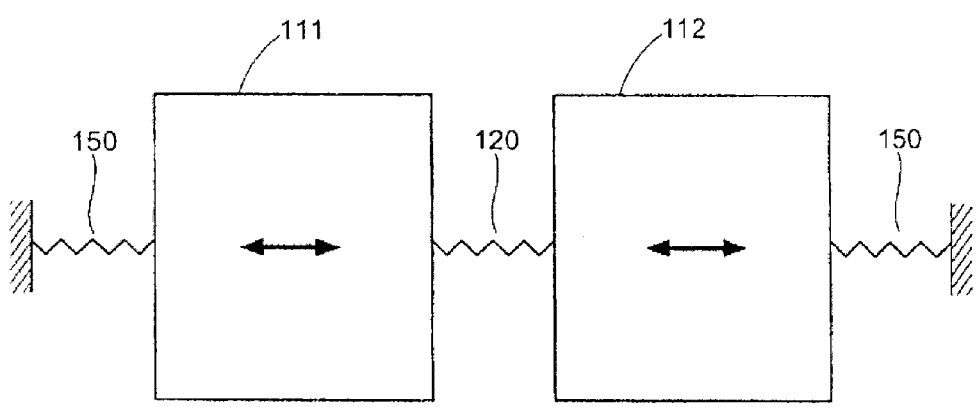
FIG. 8 is a simplified mechanical diagram of a mass-and-spring system of two masses modeling the excitation behavior of the gyrometer according to the invention.

FIG. 8 is a simplified mechanical diagram of a mass- and spring system with two masses modeling the behavior of a gyrometer according to the invention. This model contains the two inertial masses, 111 of mass $m_1$ and 112 of mass $m_2$, as well as coupling spring 120, the stiffness of which is $k_{12}$, and guide springs 150, the stiffnesses of which are respectively $k_1$ and $k_2$.

The equations of movement of masses $m_1$ and $m_2$ can be written as:

$$m_1 \ddot{X}_1 + c_1 \dot{X}_1 + k_1 X_1 = F_{exc1} - k_{12}*(X_2 - X_1)$$

$$m_2 \ddot{X}_2 + c_2 \dot{X}_2 + k_2 X_2 = F_{exc2} - k_{12}*(X_1 - X_2)$$

Supposing in addition that $k = k_1 = k_2$ and $m_1 = m_2$, subtracting the second equation hereinabove from the first yields:

$$m_1(\ddot{X}_1 - \ddot{X}_2) + c_1(\dot{X}_1 - \dot{X}_2) + k(X_1 - X_2) = F_{exc1} - F_{exc2} - 2*k_{12}*(X_2 - X_1)$$

Changing the variables by writing $X = x_1 - x_2$ then yields:

$$m\ddot{X} + c\dot{X} + X*(k + 2*k_{12}) = F_{exc1}$$

From this, in phase opposition, in other words with $X_1 = -X_2$, there is obtained a resonance frequency equal to:

$$w_0 = \sqrt{\frac{k + 2*k_{12}}{m}}$$

Similarly, by writing $X = x_1 = x_2$, there is obtained $m\ddot{X} + c_1 \dot{X} + X*k = F_{exc1}$, and thus, with $X_1 = X_2$, there is obtained a resonance frequency in phase equal to $$w_0 = \sqrt{\frac{k}{m}}$$

It therefore is noted that a mass-and-spring system with two masses may have two resonance frequencies along the same direction (one in phase and another in phase opposition). The terms in phase and in phase opposition are used because, when the masses have sinusoidal movements, it is possible to write:

Movement in phase: $x_1(t) = x_2(t) = U_1 * \cos(\omega t)$ and in phase opposition: $x_1(t) = U_1 * \cos(\omega t)$ and $x_2(t) = U_1 * \cos(\omega t + \pi)$ The resonance frequency when $x1 = x2$ corresponds to a system in phase, $\phi = 0°$. The resonance frequency in phase opposition, when $x1 = x2$, corresponds to a phase $\phi = 180°$.

Figure 9:
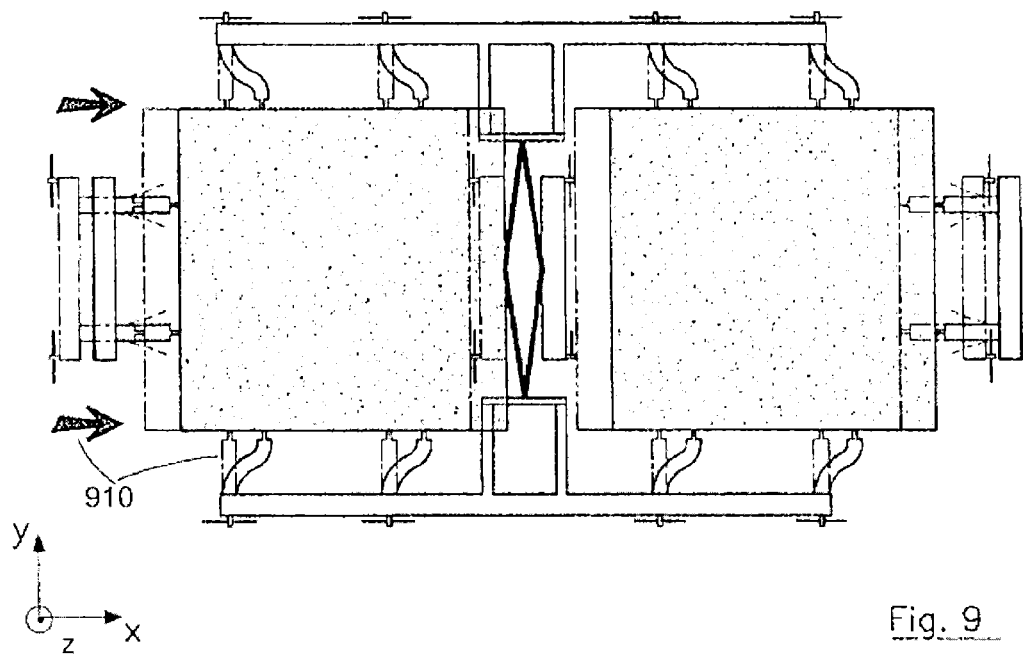
FIGS. 9 and 10 illustrate the resonance frequencies in excitation of the inertial masses along the two axes of the excitation plane.
Figure 10:
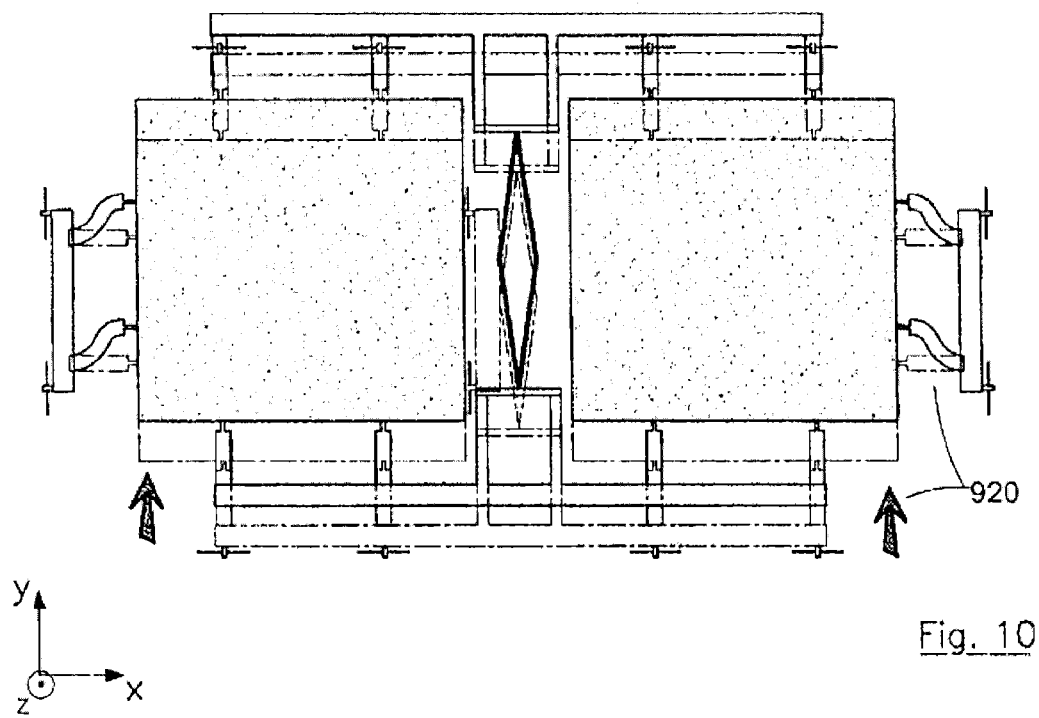

FIGS. 9 and 10 illustrate the resonance frequencies in excitation of the inertial mass along X and Y respectively.

The resonance frequency $f_{RESi}$ of a geometry is fixed by the relationship:

$$f_{RES_i} = \sqrt{\frac{k_i}{m}}$$

where m is the inertial mass and $k_i$ is the stiffness in direction i.

This stiffness varies as a function of the geometric dimensions of the springs. A complex geometric shape will not necessarily have the same stiffness along X, Y or Z. A resonance frequency is defined relative to a privileged direction. An advantageous geometry for employment of the invention will therefore have a resonance frequency 910 along X different from that 920 along Y, in order that the Coriolis forces resulting from angular displacements around these axes can be differentiated in frequency, as has been seen in the foregoing. In the examples of FIGS. 9 and 10, the resonance frequencies are respectively 21 kHz (kilohertz) and 23 kHz.

Let us suppose different resonance frequencies in excitation:

$$v_Y = A * \cos(w_Y t + \phi_Y)$$

and $$v_X = B * \cos(w_X t + \phi_X)$$

where A and B are the excitation amplitudes, $w_X$, $w_Y$ are the excitation frequencies and $\phi_X$, $\phi_Y$ represent the phase. In the presence of a rotational velocity, the Coriolis force along Z is then given by:

$$F_Z = -2*m*[\Omega_X*A*\cos(\omega_Y t) - \Omega_Y*A*\cos(\omega_X t)]$$

Because the system with two inertial masses and three springs of a gyrometer according to the invention itself also possesses one or even more resonance frequencies in detection, these are advantageously used to make it possible to amplify the signal and optimize the detection. It will therefore be preferable to position the resonance frequencies for detection as close as possible to the resonance frequencies in excitation.

If $w_{X(opp)}$ and $w_Y$ are the excitation frequencies along X and Y, and if $w_{detZ\_phase}$ and $w_{detZ\_oppi}$ are the resonance frequencies in detection of the masses along Z in phase and in phase-opposition, then it is advantageous for the following relationship to be satisfied: $W_{detZ\_phase} = W_Y$ and $w_{detZ\_opp} = W_{X(opp)}$.

For practical purposes, it may be preferable to function in open loop, in other words with $w_Y < W_{detZ\_phase}$ and $w_{X(opp)} < w_{detZ\_opp}$.

By functioning in open loop there is understood the fact that detection does not take place with electronic automatic control, as opposed to operation in closed loop. The excitation is generally always automatically controlled for a gyroscope.

The conditions hereinabove represent constraints that advantageously should be satisfied in order to optimize the amplification of the signal detected along Z, in other words the composite Coriolis force comprising a frequency component corresponding to axis X and a frequency component corresponding to axis Y.

The frequencies in excitation correspond to the resonance frequencies in plane XY. The main parameters that influence these resonance frequencies are the dimensions of guide springs 150 fastened to the excitation masses along X and Y, as shown in FIG. 2. An example of a guide spring is illustrated in FIG. 4.

The resonance frequencies in detection are resonance frequencies out of plane XY. The two out-of-plane resonance frequencies are the resonance frequencies of the inertial masses in phase and in phase opposition. The resonance in phase and the resonance in phase opposition are induced by coupling spring 120 between the two inertial masses 111 and 112. It is noted that the dimensions of the guide springs, for excitation, and of the coupling spring, for detection, may therefore be optimized separately in such a way as to fulfill the conditions of the two preceding relationships concerning the equality that must exist between resonance frequencies in excitation and in detection.

The calculation of these resonance frequencies in phase and in phase opposition is presented hereinafter. To this end there is used the following relationship, which as has already been seen expresses the dependence of resonance frequency w as a function of stiffness k and of mass m:

$$w = \sqrt{\frac{k}{m}}$$

As regards the excitation frequency along Y, the resonance frequency takes the stiffness along Y into account. The mass m in this case corresponds to the inertial mass of the system. There is therefore obtained:

$$w_{Y\_exc} = \sqrt{\frac{k_Y}{m}}$$

Along X, the resonance frequency takes the stiffness along X and also the stiffness of the coupling spring into account. Returning to the mass-and-spring system with two masses of the gyrometer of the invention, it is deduced therefrom that there will be two resonance frequencies: one in phase and the other in phase opposition.

The different resonance frequencies in excitation can be listed as follows:

$$w_{X\_exc\_phase} = \sqrt{\frac{k_X}{m}} \text{ and } \omega_{X\_EXC\_opp} = \sqrt{\frac{k_X + 2*k_{X12}}{m}} \text{ and}$$

$$\omega_Y = \sqrt{\frac{k_Y}{m}}$$

As regards the detection frequencies, the system can be projected in the out-of-plane direction, in other words along Z, and also reduced to a mass-and-spring system with two masses. As for X, two resonance frequencies are obtained:

$$\omega_{Z\_opp} = \sqrt{\frac{k_Z + 2*k_{Z12}}{m}} \text{ and}$$

$$w_{Z\_phase} = \sqrt{\frac{k_Z}{m}}$$

The conditions of equality between resonance frequencies along X and Y and detection frequencies along Z may be explained by virtue of the following relationships:

$$W_{X\_EXC\_opp} = W_{z\_opp}$$

and $$W_Y = W_{z\_phase}$$

The conditions of equality between resonance frequencies and detection frequencies are therefore equivalent to the conditions below:

$$\sqrt{\frac{k_X + 2*k_{X12}}{m}} = \sqrt{\frac{k_Z + 2*k_{Z12}}{m}} \text{ and}$$

$$\sqrt{\frac{k_Y}{m}} = \sqrt{\frac{k_Z}{m}}$$

In terms of movement, a correspondence exists between the excitation movements and the detection movements.

A resonance frequency in excitation (in plane XY) in phase must therefore be coupled with a resonance frequency in detection (out-of-plane, Z), also in phase.

Similarly, a resonance frequency in excitation (in plane XY) in phase opposition must be coupled with a resonance frequency in detection (out-of-plane, Z), also in phase opposition.

The conditions hereinabove for the detection frequencies are applicable in the case of capacitive detection. In the case of use of piezoresistive detection and of use of a piezoresistive detector as described in FIG. 6, the conditions for the resonance frequencies are the same in plane XY, whereas out of plane, along Z, the stiffness of the detection arm must then be taken into account.

The resonance frequencies found in the plane are identical to those seen in the foregoing:

$$\omega_{X\_EXC\_opp} = \sqrt{\frac{k_X + 2*k_{X12}}{m}} \text{ and}$$

$$w_{Y\_exc} = \sqrt{\frac{k_Y}{m}}$$

On the other hand, the resonance frequencies out-of-plane, along Z, are increased by a constant $\sqrt{k_{det}}$ as follows:

$$\omega_{Z\_opp} = \sqrt{\frac{k_Z + 2*k_{Z12} + k_{det}}{m}} \text{ and}$$

$$w_{Z\_phase} = \sqrt{\frac{k_Z + k_{det}}{m}}$$

As in the foregoing, the condition of equality between resonance frequencies along X and Y and detection frequencies along Z may be explained by virtue of the following relationships:

$$W_{X\_EXC\_opp} = W_{z\_opp}$$

and $$W_Y = W_{Z\_phase}$$

In the case of piezoresistive detection, the conditions of equality between resonance frequencies in the excitation plans and detection frequencies therefore become:

$$\sqrt{\frac{k_X + 2*k_{X12}}{m}} = \sqrt{\frac{k_Z + 2*k_{Z12} + k_{det}}{m}} \text{ and}$$

$$\sqrt{\frac{k_Y}{m}} = \sqrt{\frac{k_Z + k_{det}}{m}}$$

Figure 11:
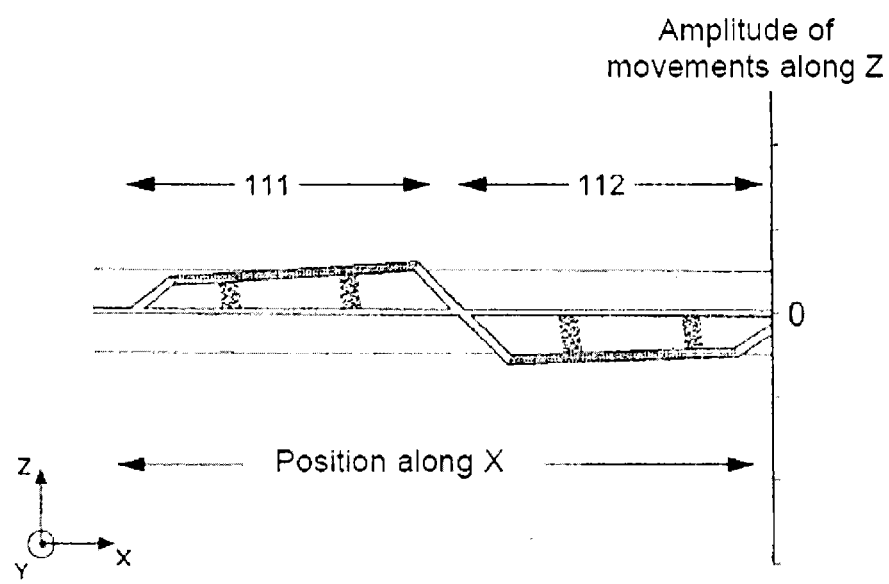
FIG. 11 illustrates the case of detection of movements of the coupled inertial masses when they are in phase opposition.

FIG. 11 illustrates the case of detection of movements along Z of inertial masses 111 and 112 when they are in phase opposition.

Figure 12:
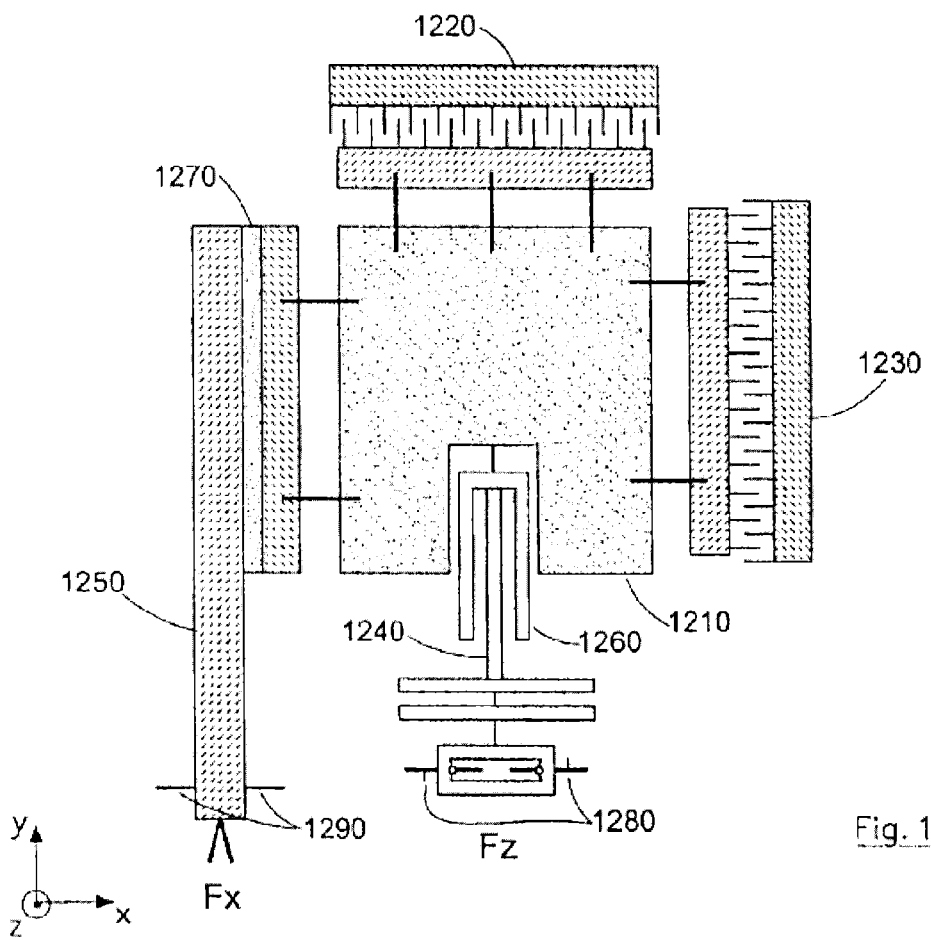
FIG. 12 illustrates the block diagram of an inertial unit with five excitation axes in the plane.
Figure 13A:
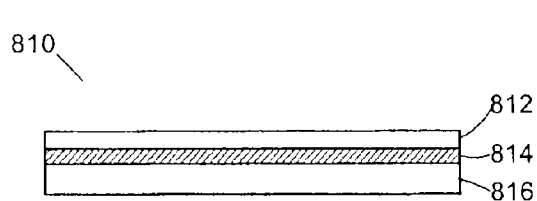
FIGS. 13a to 13i describe the principal steps of a method for producing MEMS compatible with the manufacture of inertial sensors according to the invention.
Figure 13F:
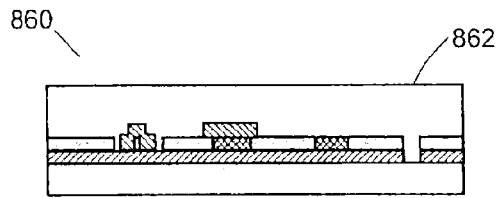
Figure 13B:
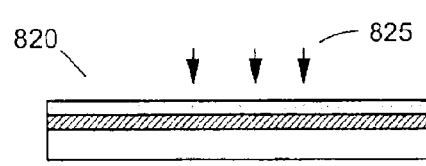
Figure 13G:
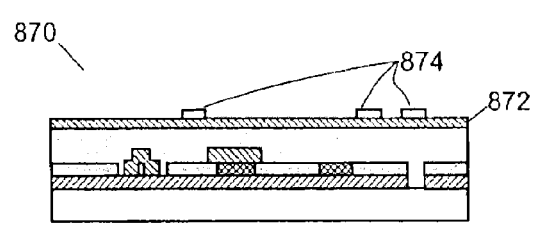
Figure 13C:
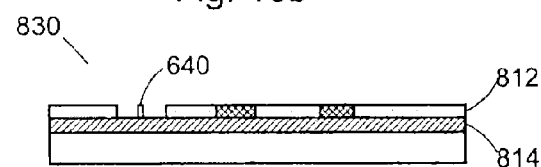
Figure 13H:
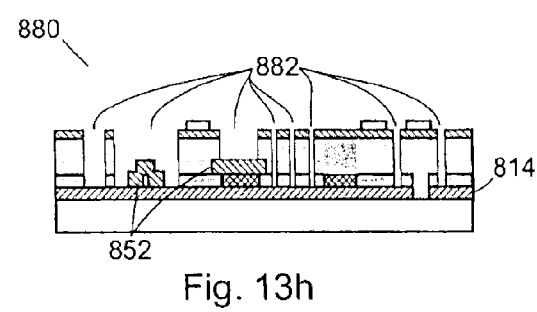
Figure 13D:
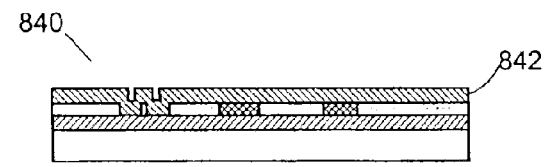
Figure 13E:
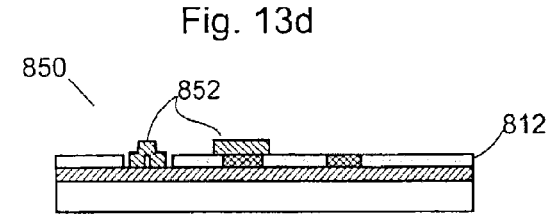
Figure 13I:
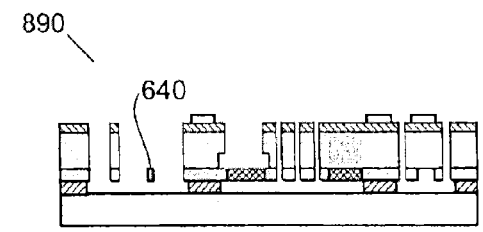

FIG. 12 illustrates the block diagram of an inertial unit with five excitation axes in the plane.

A first aspect of this embodiment is the use of a single inertial mass 1210, which also functions as detection mass.

If it is considered that an inertial mass excited along the three axes X, Y and Z at frequencies of respectively $w_x$, $w_y$ and $w_z$, corresponding to electrostatic excitation, which is expressed, for example along Y, as follows:

$$v_Y = A * \cos(w_Y t + \omega_Y);$$

then the Coriolis forces created are as follows:

$$F_X = -2*m*(\Omega_Y \wedge v_Z + \Omega_Z \wedge v_Y)$$

$$F_Y = -2*m*(\Omega_X \wedge v_Z + \Omega_Z \wedge v_X)$$

$$F_Z = -2*m*(\Omega_X \wedge v_Y + \Omega_Y \wedge v_X)$$

The forces induced by the Coriolis effects along each axis yield information on the velocities of rotation around the other two axes. By measuring the forces applied to the inertial mass along only two axes, it is therefore possible to have access to the angular velocities around the three axes.

The possible improvements of such a device relate to:
Separation of excitation and detection so that the vibrations having amplitudes much larger than the signals induced by the Coriolis force are not measured.
Dissociation of the different detection parts. A spring system with two stages, wherein each stage has the objective of not transmitting the movement or the stresses along a selected axis (two stages being necessary so that the movement is transmitted only along a single axis, the measuring axis).
Insensitivity to acceleration. It will be possible to implement equilibrium or a system of "dual mass" type, so that an acceleration does not induce a signal on the diverse detection parts.

When the three equations hereinabove are examined, it is noted that only the excitations in the XY plane are necessary in order to obtain the velocities of rotation around all the axes: $\Omega_X$ and $\Omega_Y$ being measured by means of $F_Z$ and $\Omega_Z$ being measured by means of $F_X$ or $F_Y$.

In FIG. 12, central inertial mass 1210 is excited in plane XY by peripheral masses 1220 and 1230, which transmit only the movement along the corresponding excitation axis, respectively along Y and X. The detection part comprises an arm 1240 measuring the force along $F_Z$. Furthermore, an additional mass 1250 is formed with a movement around a pivot in Z, making it possible to measure a force $F_x$ along X, the Coriolis force induced on inertial mass 1210 by an angular displacement around Z in the presence of an excitation along Y. The mobility of inertial mass 1210 in rotation around Z is therefore the object of detection.

Springs 1260 and 1270 linking the detection parts and inertial mass 1210 are dimensioned in such a way that they transmit to the detection part only the stress along the corresponding detection axis, respectively along Z and along X. It is noted that each of the detection parts possesses a lever arm in order to amplify to the maximum the signal delivered by the inertial mass.

Returning to the first of the equations hereinabove, that yielding $F_x$, and to the third, that yielding $F_Z$, and applying them to the system of FIG. 12, it is found that the movements detected via the detection arms are:

$$F_Z = -2*m*(\Omega_X \wedge v_Y + \Omega_Y \wedge v_X) + a_Z$$

$$F_X = -2*m*\Omega_Z \wedge v_Y + v_X + a_X$$

Arm Z 1240 measures a signal having three components:
a component $\Omega_X$ with a frequency $w_Y$,
a component Sty with a frequency $w_X$,
the component $a_Z$ of the acceleration at a low frequency, typically lower than 1 kHz.
Similarly, arm X 1250 measures:
a component $\Omega_Z$ with a frequency $w_Y$,
the acceleration along X, in other words $a_X$,
the excitation along X (Vx) will also be visible at a frequency $w_X$. Preferably it will be eliminated during demodulation of the signal.

The foregoing is summarized in the table below.

|  | Frequency components of signal $F_Z$ | | | Frequency components of signal $F_X$ | | |
| --- | --- | --- | --- | --- | --- | --- |
| Component: | $a_Z$ | $\Omega_Y$ | $\Omega_X$ | $a_X$ | Vx | $\Omega_Z$ |
| Frequency: | Low | $w_X$ | $w_Y$ | Low | $w_x$ | $w_Y$ |

With the system of FIG. 12, five axes therefore are measured with only two pairs of piezoresistive gauges 1280 and 1290. The surface area necessary for electrical connections is therefore reduced.

Although not illustrated. an alternative is possible with detection of frequency components of the signal for measurement of force FY, the Coriolis force along Y. The assembly formed by the elements denoted 1250, 1270, 1290 is simply pivoted by 90° and linked to exciter 1220.

FIGS. 13a to 13i describe the main steps of a method for producing MEMS, which method is compatible with the manufacture of inertial sensors according to the invention. The steps of the method potentially employ all the known techniques (photolithography, etching, deposition of materials of all kinds, etc.) and manufacturing methods developed by the microelectronics industry for the manufacture of integrated circuits and electromechanical devices of MEMS type.

The starting material is a prepared substrate 810 referred to as SOI for the English "silicon on insulator", provided at the surface with a thin layer of monocrystalline silicon 812 insulated by an oxide layer 814 of substrate 816. Layer 812 typically has a thickness of 400 nm (nanometer=$10^{-9}$ meter) and oxide layer 814, referred to as buried, has a typical thickness of 1 prn (micrometer=$10^{-6}$ meter).

The following step 820 consists of doping monocrystalline layer 812 by ion implantation 825 and achieving homogenization over the entire thickness of the silicon layer by performing thermal annealing, typically at 1050° C. for 5 minutes.

The following step 830 consists of defining what is known as the thin part of the MEMS by photolithography and etching it in monocrystalline silicon layer 812. It is in this layer that the piezoresistive gauges in particular are formed, for example gauges 640 of FIG. 6. Etching is stopped at the oxide of buried layer 814.

Then, in the following step 840, a layer 842 of silicon oxide is deposited to provide protection during operations of liberation of the movable parts of the MEMS described hereinafter. Typically a thickness of 250 nm is deposited by the HDP (high density plasma) deposition technique for example.

In step 850, protective patterns are etched in the silicon oxide layer, which has a thickness of 250 nm. Etching is stopped at silicon layer 812.

In step 860, thick silicon epitaxy is formed in order to obtain layer 862, in which the fixed and movable parts of the MEMS will be produced. Typically, the deposited thickness is 20 µm. Layer 862 is planarized after growth, typically by means of mechanochemical polishing of the type known as CMP, the English acronym for "chemical mechanical polishing".

In step 870, a metal such as an alloy of aluminum and silicon (AlSi) is deposited, which makes it possible to form, after photolithography and etching, all the necessary electrical interconnections 874 on a layer 872.

Layer 872 is an implanted layer (highly doped, identical to step 820). It is used to improve the metal/silicon contact.

Deep etching of the silicon is then performed in step 880, which makes it possible to define, in thick layer 882, the movable parts of the MEMS, especially the two masses of the inertial sensor of the invention with its springs. Etching is continued until stopped on an oxide layer. For example, on protective patterns 852 defined previously in step 850. Oxide layer 814 of the SOI substrate also functions as a stop layer where no protective pattern was formed.

Liberation of the movable parts takes place in the following step 890, by dissolving the parts of the oxide layers referred to as sacrificial, where they became accessible after deep etching. In this way the represented structure in which the movable parts are liberated is obtained (underlying oxide is no longer present). Suspended piezoresistive gauges 640 formed in thin layer 812 are also liberated, so that they can be subjected to tension/compression by the pivoting arms, such as arm 610 of FIG. 6.

The invention is not limited to the described embodiments but extends to any embodiment in conformity with its spirit.

The invention claimed is:

1. An inertial micro-sensor of angular displacements comprising:
   at least one inertial mass (112, 1210) movable in space (X, Y, Z);
   a first exciter (131) configured to generate a first vibratory movement of the inertial mass along a first direction (X), so as to generate a first Coriolis force along a third direction (Z), induced by an angular displacement of the inertial mass around a second direction (Y), the first, second and third directions being mutually perpendicular;
   a second exciter (132) configured to generate a second vibratory movement of the inertial mass (112, 1210) along a second direction (Y), so as to generate a second Coriolis force along the third direction (Z), induced by an angular displacement of the inertial mass (112, 1210) around the first direction (X);
   means for detecting the first Coriolis force and the second Coriolis force, characterized by the fact that the detection means comprise a common detector for the first Coriolis force and the second Coriolis force and configured to produce an electrical signal processed by a processing circuit so as to distinguish a first component of the electrical signal corresponding to the first Coriolis force and a second component of the electrical signal corresponding to the second Coriolis force, and by the fact that it is provided with a detection mass (111) kinematically linked to the inertial mass (112) and at which the common detector detects the first Coriolis force and the second Coriolis force.

2. A sensor according to the preceding claim, wherein the frequency of the first vibratory movement is different from the frequency of the second vibratory movement.

3. A sensor according to the preceding claim, wherein the processing circuit of the detection means is configured to achieve frequency processing of the electrical signal.

4. A sensor according to the preceding claim, wherein the processing circuit is provided with a first frequency filter configured to distinguish the first component of the electrical signal and a second frequency filter configured to distinguish the second component of the electrical signal.

5. A sensor according to one of the preceding claims, wherein for each of the first and second components, the processing circuit is provided with demodulation of the variation of amplitude.

6. A sensor according to one of the preceding claims, wherein the first exciter (131) is configured to make the inertial mass (112, 1210) vibrate at its resonance frequency along the first direction (X).

7. A sensor according to one of the preceding claims, wherein the second exciter (132) is configured to make the inertial mass (112, 1210) vibrate at its resonance frequency along the second direction (Y).

8. A sensor according to one of the preceding claims, wherein the first exciter (131) is provided with a generator of the first vibratory movement and with an excitation mass driven in vibration by the generator and kinematically linked to the inertial mass so as to deliver thereto the first vibratory movement without transmitting at least part of the movements along the second and third direction (Z).

9. A sensor according to one of the preceding claims, wherein the second exciter is provided with a generator of the second vibratory movement and with an excitation mass driven in vibration by the said generator and kinematically linked to the inertial mass so as to deliver thereto the second vibratory movement without transmitting at least part of the movements along the first and third direction (Z).

10. A sensor according to one of the preceding claims, wherein the detection mass (111) is kinematically linked to the inertial mass (112) by a link configured to form, together with the inertial mass (112), along the first direction (X), an inertial assembly (110) exhibiting at least two resonance frequencies.

11. A sensor according to one of the preceding claims, wherein the detection mass (111) is kinematically linked to the inertial mass (112) so as to be animated by the second vibratory movement.

12. A sensor according to one of the preceding claims, wherein the detection mass (111) is kinematically linked to the inertial mass (112) so as to form, in the third direction (Z), an inertial assembly (110) exhibiting at least two resonance frequencies.

13. A sensor according to claim 12, wherein the frequency of the first vibratory movement and the frequency of the second vibratory movement are lower than or equal respectively to a first and a second resonance frequency of the inertial assembly in the third direction (Z).

14. A sensor according to the preceding claim, wherein the first resonance frequency is a resonance frequency in phase opposition and the second resonance frequency is a resonance frequency in phase.

15. A sensor according to one of the preceding claims, comprising:
   an additional inertial mass (1250), movable in a plane formed by the second direction (Y) and the direction (Z) of the first Coriolis force and of the second Coriolis force, the said additional inertial mass being linked to the inertial mass (1210) in such a way as to transmit to the said additional inertial mass a Coriolis force along the second direction (Y), induced by an angular displacement of the said inertial mass around the third direction (Z) out of the plane (x, y);

an additional detector (1290) configured to detect the said Coriolis force (1290).

16. A sensor according to one of the preceding claims, comprising:

an additional inertial mass (1250) linked to the inertial mass (1210) so as to transmit to the said additional inertial mass a Coriolis force along the first direction (X), induced by an angular displacement of the said inertial mass around the third direction (Z) out of the plane (x, y);

an additional detector configured to detect the said Coriolis force.

* * * * *